Patented Jan. 16, 1923.

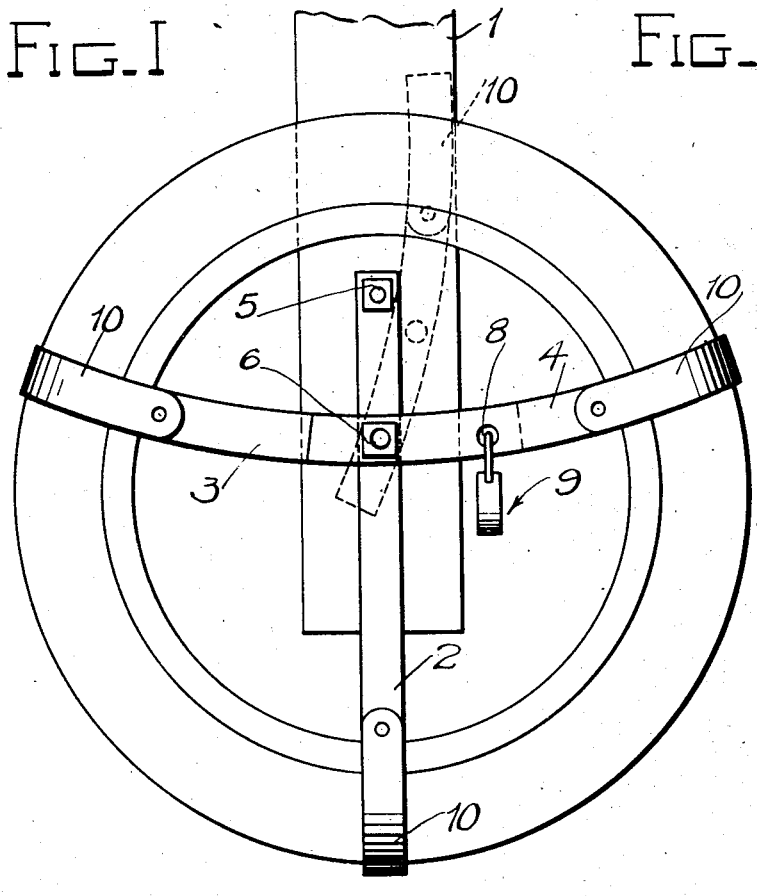
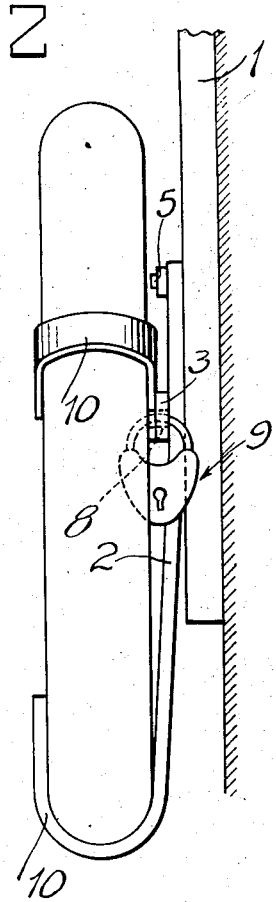
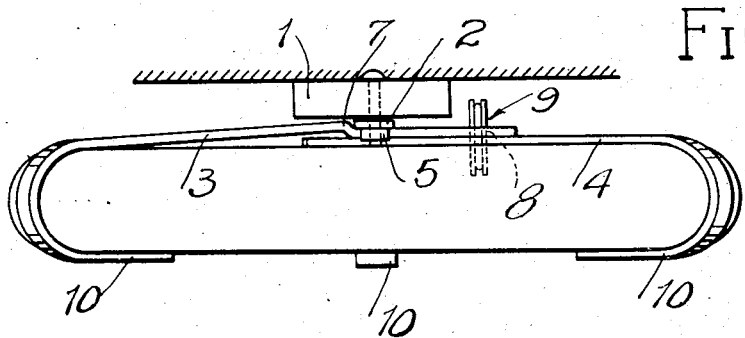

1,442,285

UNITED STATES PATENT OFFICE.

WILLIAM H. McKAY AND EDWARD E. DOERING, OF MUSKOGEE, OKLAHOMA.

SPARE-TIRE HOLDER FOR AUTOMOBILES.

Application filed June 23, 1921. Serial No. 479,839.

*To all whom it may concern:*

Be it known that we, WILLIAM H. McKAY and EDWARD E. DOERING, citizens of the United States, residing at Muskogee, in the county of Muskogee and State of Oklahoma, have invented certain new and useful Improvements in Spare-Tire Holders for Automobiles; and we do declare the following to be a full, clear, and exact description of the invention, such as will enable others skilled in the art to which it appertains to make and use the same.

This invention relates to an improved spare tire holder for use on automobiles, and it has for its object to generally improve upon devices of this class by providing one of extreme simplicity and durability which is such in construction that it can be readily installed on an automobile without special attaching means and will suffice for effectively holding a tire and permitting it to be quickly attached and detached whenever necessary or desired.

Another object of the invention is to provide a holder of this class which is composed of an attaching member and three radial arms having tire grips at their outer ends, two of these arms being immovable and the remaining one being pivoted so that it can be swung to a position to permit the tire to be quickly attached or detached.

Other objects and advantages of the invention will become apparent during the course of the following description.

In the accompanying drawings which form a part of this specification and in which like parts are designated by like numerals throughout the same:

Figure 1 is an elevational view of a tire holder constructed in accordance with this invention showing a tire in position thereon.

Figure 2 is an elevational view looking from one side of the car.

Figure 3 is a top plan view thereof.

In carrying out the invention, we make use of an attaching member 1 which may be of any suitable construction and such that it can be bolted or otherwise secured in a convenient position on the rear end of the automobile body. As before indicated, the holder proper comprises a plurality of radial arms 2, 3 and 4 respectively, the first-named of which is somewhat heavier and larger than the others and is permanently secured by suitable fastenings 5 and 6 on the attaching member 1. It is to be stated here that the fastening 6 which passes through the arm 2 also passes through the remaining arms 3 and 4 and serves to secure these arms in place. It is to be noted that the arm 3 is offset intermediate its ends as indicated at 7 and this offset portion provides a shoulder which bears against the adjacent vertical edge of the arm 2 and prevents movement of this arm 3, making it stationary with the arm 2. Before completing the arm 3, it is to be stated that the inner end of this arm extends across the arm 2 and attaching piece 1 and beyond the latter. The arm 4 likewise extends across these parts and has its inner end lapped over the corresponding end of the arm 3 and both of these arms are formed with openings 8 which are designed to be registered with one another to permit the shackle of a padlock 9 to be passed therethrough for holding the arms 4 against movement. With this construction and arrangement it will be seen that the fastening which serves to connect the arm 2 with the attaching member, also functions to connect the remaining arms in place and serves as a pivot for the arm 4 and permits this arm to be swung to the dotted line position indicated in Fig. 1 so that the tire can be easily removed from the holder. These arms are equipped at their outer ends with suitable means for gripping the tire and in the preferred form of the invention, these grips are provided by simply bending the free ends of the arms to provide hooks 10.

Assuming that the tire is in place and it is desired to remove the same from the holder in order to use it in the place of a punctured or otherwise damaged tire, it can be as quickly and easily removed from the holder by simply removing the padlock 9, and grasping the arm 4 and moving it upwardly on its pivot until it assumes a position approximating that indicated by he dotted lines in Fig. 1. The tire can then be easily disengaged from the hooks 10. It can also be just as easily engaged by these hooks when placing the tire in position on the holder. The attaching member 1 is designed to be secured in any suitable way to the rear or side portion of the automobile as before indicated.

By carefully considering the description in connection with the drawings, persons familiar with tire holders will doubtless be able to obtain a clear understanding of this invention. Therefore, a more lengthy and detailed description is thought unnecessary.

Since excellent results may be obtained with the construction and arrangement herein described and shown, this construction and arrangement may be taken as a preferred embodiment of the invention. We wish it to be understood however that within the scope of the subjoined claims numerous minor changes in shape, size and arrangement of parts may be made.

We claim:

1. A spare tire carrier comprising an attaching device and a plurality of radial arms provided with tire engaging means at their outer ends; means for attaching one of said arms in fixed permanent relation to said attaching device, means for attaching a second of said arms in fixed permanent relation to said first mentioned arm, said means including a bearing member upon which a third of said arms is adapted to be pivotally mounted, a third arm carried by said bearing means, and independent means adapted to lock said third arm to said second arm.

2. A spare tire carrier comprising an attaching member for connection to the machine, a plurality of radial arms having tire grips at their outer ends, one of said arms being immovably secured to said member, the other arms having their inner ends overlapped, a fastening passing through said ends and permitting pivotal movement of one arm, and co-acting means between the remaining arm and said stationary arm for holding said remaining arm against movement.

3. A spare tire carrier comprising an attaching member for permanent connection with the automobile, and a holder composed of a plurality of radial arms bent at their outer free ends to form tire engaging hooks, one of said arms being permanently connected with said attaching member, the inner ends of the remaining arms being disposed crosswise of this arm and having their ends overlapped, one of these last-named arms being offset intermediate its ends to provide a shoulder and this shoulder being engaged with the adjacent vertical edge of the first-named arm to prevent movement of this said one remaining arm, and both of the horizontal arms being formed with alined holes to permit passage of the shackle of a padlock therethrough for connecting the arms together and preventing relative movement thereof, and a fastening passing through all of said arms and permitting pivotal movement of one of the arms.

4. A spare tire carrier comprising an attaching member, and a holder composed of a plurality of radial arms provided with tire engaging means at their outer ends; one of said arms being permanently connected to said attaching member and the inner ends of the remaining arms being disposed crosswise of the fixed arm and having their ends overlapped, one of said remaining arms having an offset portion intermediate its ends to provide a shoulder adapted to engage the adjacent vertical edge of the fixed arm to prevent movement of said first mentioned remaining arm, and means for locking a second of said remaining arms to the first mentioned one.

In testimony whereof we have hereunto set our hands.

WILLIAM H. McKAY.
EDWARD E. DOERING.